(12) United States Patent
Hu

(10) Patent No.: US 9,140,400 B2
(45) Date of Patent: Sep. 22, 2015

(54) SUPPORT FOR SHED TYPE DRYER

(76) Inventor: Jiebo Hu, Cixi (CN)

( * ) Notice: Subject to any disclaimer, the term of this patent is extended or adjusted under 35 U.S.C. 154(b) by 0 days.

(21) Appl. No.: 13/700,514

(22) PCT Filed: Mar. 9, 2011

(86) PCT No.: PCT/CN2011/000374
§ 371 (c)(1),
(2), (4) Date: Nov. 29, 2012

(87) PCT Pub. No.: WO2011/150667
PCT Pub. Date: Dec. 8, 2011

(65) Prior Publication Data
US 2013/0075548 A1   Mar. 28, 2013

(30) Foreign Application Priority Data

Jun. 2, 2010 (CN) .......................... 2010 1 0191363

(51) Int. Cl.
*F26B 25/18* (2006.01)
*F16M 11/00* (2006.01)
*D06F 58/00* (2006.01)
*D06F 57/04* (2006.01)
(Continued)

(52) U.S. Cl.
CPC .............. *F16M 11/00* (2013.01); *D06F 57/04* (2013.01); *D06F 58/00* (2013.01); *D06F 59/00* (2013.01); *D06F 57/02* (2013.01); *D06F 58/14* (2013.01)

(58) Field of Classification Search
CPC ......... D06F 58/10; D06F 58/14; D06F 57/02; D06F 57/04; A47K 10/00; F26B 9/063

USPC ........... 248/163.1, 188, 188.1, 188.8; 34/210, 34/218, 201, 202, 225, 239; 68/3 R, 5 R
See application file for complete search history.

(56) References Cited

U.S. PATENT DOCUMENTS

| 4,801,123 A * | 1/1989 | Lynch ........................... 248/524 |
| D585,672 S * | 2/2009 | Mazzera ................... D6/708.25 |
| 8,327,558 B2 * | 12/2012 | Hu .................................. 34/210 |

FOREIGN PATENT DOCUMENTS

| CN | 2672135 Y | 1/2005 |
| CN | 1707015 A | 12/2005 |

(Continued)

OTHER PUBLICATIONS

Examiner's Action in the European Patent Office (in English), Jul. 10, 2013.

(Continued)

*Primary Examiner* — Todd M Epps
(74) *Attorney, Agent, or Firm* — Karim Lagobi

(57) ABSTRACT

A support for a shed type dryer comprises a plurality of feet (1) arranged under a heater housing (2) of the dryer. The foot (1) is curved on the whole, and comprises a first part (11), a second part (12) and a third part (13) successively connected; wherein an end of the first part (11) is located at a bottom of the heater housing (2), and the first part (11) is connected with the heater housing (2); the second part (12) is arched; and an end of the third part (13) has a horizontal bottom surface (13*a*) to stand up on the ground. As compared with the prior art, the present foot can not only shorten the distance between the heater in the dryer and the ground, so as to lower the gravity centre of the dryer, so that the dryer can stand up more stably and is helpful to arrange a drying room with a relatively large size.

4 Claims, 10 Drawing Sheets

(51) Int. Cl.
*D06F 59/00* (2006.01)
*D06F 57/02* (2006.01)
*D06F 58/14* (2006.01)

(56) References Cited

FOREIGN PATENT DOCUMENTS

| CN | 2895492 Y | 5/2007 |
| CN | 101831788 A | 9/2010 |
| CN | 201695245 U | 1/2011 |
| DE | 102004026266 A1 | 12/2005 |
| GB | 683288 A | 11/1952 |
| JP | 55-20310 | 2/1980 |
| JP | 2006-006354 A | 1/2006 |
| JP | 2006006354 A | 1/2006 |
| JP | 2006-296801 A | 11/2006 |
| JP | 2010-517645 A | 5/2008 |
| JP | 3142564 U | 5/2008 |
| KR | 10-0857409 B1 | 9/2008 |
| WO | WO2008122187 A1 | 10/2008 |

OTHER PUBLICATIONS

Examiner's Action in the Japanese Patent Office, with English translation, Jul. 10, 2013.
European search report, Jan. 27, 2014.

* cited by examiner

SUPPORT FOR SHED TYPE DRYER

BACKGROUND OF THE INVENTION

1. Field of the Invention

The present invention relates to a technical field of a shed type dryer, in particular, to a support for the shed type dryer.

2. Description of the Related Art

The shed type dryer is a domestic electrical appliance to dry clothes with hot wind. This is particularly applicable for the rainy south, to bring convenience to people's lives. Chinese Utility Model patent with patent number of ZL200620018906.7(published number CN2895492Y), entitled "a shed type dryer", being a previous patent of the applicant, disclosed such a dryer. The shed type dryer includes a foot/feet, a heater located on the foot/feet, a lower support pipe and an upper support pipe connected with the lower support pipe. An arched supply-air shed is disposed on an upper end of the heater; and the lower support pipe is fixed by a nut of the arched supply-air shed. An outer casing is fixed on the support pipes, while sheet-shaped baffles are uniformly disposed on an air outlet of the supply-air shed in a circumference direction thereof. Upon operating, the heater heats up air from an air inlet thereof, which is exported through the air outlet of the supply-air shed. Then, the air will be blown upwardly toward clothes placed within the outer casing, thereby achieving the aim of drying clothes.

The foot/feet in the existing shed type dryer all are straight rod shaped and titled, i.e., the inclined supporting and straight rod feet. The dryer is typically provided with three straight rods, thereby forming a tripod at a bottom of the dryer. The tripod will lift the heater from the ground, and support the heater, support pipes and the clothes thereon altogether.

Particularly, there is a pair of correlated relationships between an inclination angle of the inclined supporting and straight rod feet to a vertical direction of the dryer and an inclination angle of the straight rod feet to the ground.

When the straight rod feet tend to be in parallel to the vertical direction of the dryer, the inclination angle of the straight rod feet to the ground will became closer to 90°. In this case, although it is beneficial for the feet to bear saging gravity from the overall dryer, it is disadvantageous for the overall dryer to stand up stably. If it is intended to allow the overall dryer to stand up stably, it is necessary to correspondingly lengthen the straight rod feet. However, the lengthened straight rod feet will increase manufacturing cost, and the drying room of the dryer will also rise too high, which will cause inconveniences for the user to perform the operation of hanging up the clothes. On the other hand, the lengthened straight rod feet will decrease bending rigidity of the straight rod feet either, and enhancing the straight rod feet will incur increase of the cost. Moreover, if the gravity centre of the dryer is too high, then the dryer will tend to sway in usage. This is adverse for the dryer to stand up stably.

When the inclination angle of the straight rod feet to the vertical direction of the dryer tends to become 90°, the straight rod feet and the ground will become substantially in parallel with each other. In this case, position of the gravity centre of the dryer falls down, but there is a more rigorous requirement on the bending rigidity of the straight rod feet. Connection between the straight rod feet and the heater will be easily broken down, due to the outwardly expanding force therebetween. There is a potential trouble on a safe connection between them. It is necessary to reinforce the bending rigidity of the straight rod feet, and the connection firmness between the straight rod feet and the heater. Therefore, there is a higher demand on material of the straight rod feet and a certain restriction is applied on weight of the clothes to be dried.

In the existing dryer with the inclined supporting and straight rod feet, an inclination angle of the straight rod feet to the ground is in a range of 60°-70°. The straight rod feet have a height of 40-50 cm, and the heights of the heater and the drying room are respectively 20-30 cm and 90-110 cm. The clothes-bar has a height of 150-190 cm above the ground. In living, the clothes having longer length such as one-piece dress of adult female, typically have a length of 130-150 cm. Therefore, upon drying, it is needed to fold them and hang up them, which often wrinkles the clothes. However, if the height of the drying room is increased to adapt the height and size of the one piece dress, the radial span of the straight rod feet under the heater and the distance of the feet from the ground also should be increased, so as to facilitate the standing up stability of the overall dryer. As such calculated, the height of hanging up the cloths will be up to the range of 190-230 cm. As for an adult having normal stature, it is not very convenient to perform a hanging or picking operation at such height of the drying room, without any climbing tools. Therefore, it is not advantageous for the inclined supporting and straight rod feet to provide a drying room having a relatively large size/height.

Concerning the above, it is needed to further improve the existing inclined supporting and straight rod feet.

SUMMARY OF THE INVENTION

A technical problem to be solved by the present invention is to provide a support for the shed type dryer with respect to the prior art situation. It not only shortens a distance between a heater in the dryer and the ground, but also lowers a gravity centre of the dryer, so that the dryer can more stably stand up and has a drying room suitable for being provided with a relatively large size. In the case of the drying room having a relatively large size, the operation of handing or picking up the cloths is still convenient and becomes very humanized.

A solution adopted by the present invention for the above technical problem is:

the support for a shed type dryer comprises a plurality of feet arranged under a heater housing of the dryer, wherein the feet comprises a first part, a second part and a third part successively connected;

wherein an end of the first part is located at a bottom of the heater housing, and the first part is connected with the heater housing; the second part is formed by firstly extending a certain distance toward an upper direction of a periphery of the heater housing from bottom to top and from inside to outside to gradually become away from the heater housing, and then extending toward a ground direction of the periphery of the heater housing from top to bottom and from inside to outside to fall down therefrom; and an end of the third part has a horizontal bottom surface to stand up on the ground.

The feet can be of various types. Preferably, each foot can be curved on the whole, and the second part has a peak point on a curve line thereof. That is, the second part is arched.

The feet can also be not curved, i.e., the second part can be an inverse V shape.

As a further improvement, a shape of the first part of the foot can be matched with that of the heater housing, and an upper surface of the first part is attached to the heater housing so as to hold the heater. In other words, the first part is connected with the heater housing in a form of arm holding, to increase area of the first part bearing the heater, thereby improving the supporting capability of the whole foot to the heater.

Preferably, an upper surface of the first part of the foot has a protrusion, which is in contact with the heater housing. As such, the protrusion of each foot will jack up the heater.

Moreover, a plurality of feet can be beforehand integrally formed together. Specifically, a connecting portion is included herein, which is connected with the end of the first part of each foot respectively, thereby integrally connecting the feet.

In order to better attach the first part to the heater housing, the bottom of the heater housing can be provided with a groove thereon which is adapted to the shape of the first part, and the upper surface of the first part is embedded within the groove.

The first part of the foot can be connected with the heater housing by various existing methods. In order to make the product manufactured and processed easily, the first part can be provided with through holes therethrough and the bottom of the heater housing accordingly has a screw hole. A screw rod is threaded to the screw hole of the heater housing by passing through the through hole of the first part. Such design leads to easy assembly and connection.

As a further improvement, the second part of the foot is branched toward two sides, and has two ends. The foot includes two third parts, which are respectively connected with the ends of the second parts, so as to improve the standing up stability of the foot.

Another technical solution adopted by the present invention for the above technical problem is:

the support for a shed type dryer comprises a plurality of feet arranged under a heater housing of the dryer, wherein, each foot is curved on the whole and comprises a first part, a second part and a third part successively connected;

wherein an end of the first part is connected with the heater housing; the second part is formed by firstly extending a certain distance toward upper direction of a periphery of the heater housing from bottom to top and from inside to outside to gradually become away from the heater housing, and then extending toward a ground direction of the periphery of the heater housing from top to bottom and from inside to outside to fall down therefrom; and an end of the third part has a horizontal bottom surface to stand up on the ground.

In order to enlarge supporting area of the feet to the heater, preferably, the end of the first part has an attachment portion, the shape of which is matched with that of the heater housing, and an inner surface of the attachment portion is attached to the heater housing.

Another yet technical solution adopted by the present invention for the above technical problem is:

the support for a shed type dryer being a support seat with a smooth surface, the support seat comprises a first part at a central thereof, a second part at a periphery of the first part and a third part at a bottom of the support seat, integrally connected;

wherein a section of the first part is bowl shaped, to hold the heater housing;

a section of the second part is in a shape which firstly extends a certain distance toward upper direction of a periphery of the heater housing from bottom to top and from inside to outside to gradually become away from the heater housing, and then extends toward a ground direction of the periphery of the heater housing from top to bottom and from inside to outside to fall down therefrom; and a bottom edge of the third part is horizontal to stand up on the ground.

The support seat can be in various forms, for example, the support seat can be a shroud body with a circular shape in a top view.

Also for example, the support seat can be a plurality of brackets which are arranged to be centrosymmetric about the heater housing. Each bracket is a sector shaped in a top view thereof.

As a further improvement, the support seat can be symmetrically provided with a plurality of through holes.

As a further improvement, the through holes may include four set of holes, and each set of through holes includes an inside through hole and an outside through hole arranged from centre to periphery of the support seat in sequence, so that the support seat is formed with four support feet, a first connecting ring connected to the second part of each support feet and a second connecting ring connected to the bottom edge of the third part of each support feet, thereby allowing structure to be more symmetric and stable.

As compared with the prior art, the present invention has the following advantages:

Firstly, arcuated tortuous feet can reduce the distance between the heater and the ground to its maximal limitation, so that it is possible to reduce the overall height of the shed type dryer, which is more suited for minor pupil and people having short stature. Of course, it is possible to maintain the overall height of the shed type dryer, and to enlarge the height of the drying space, thereby more facilitating to dry the articles having relatively large length or size, such as overcoat, one piece dress, and bedclothes and so on.

Secondly, the larger the radian of the respective segmental arc is, the lower the gravity centre of the shed type dryer on the whole is. And the bigger the supporting force of the each foot to the ground is, the whole of corresponding shed type dryer will become more stable.

Thirdly, there is a tortuous shape in opposite directions between the adjacent segmental arcs of the foot. When being used to dry clothes, weight of the clothes to be dried, the heater, the support rod and the outer casing can be transferred to each foot through the connection between each foot and the heater, while the pressure subjected by each foot may in turn be resolved into stresses of respective segmental arcs in accordance with the parallelogram law on force. Therefore, this reduces the stress of each foot, and reduces the damage to the foot. On basis of the known type of the foot, this further reduces the requirement on material and saves production cost.

Concerning the above, the present foot not only shortens a distance between a heater in the dryer and the ground, but also lowers the gravity centre of the dryer, so that the dryer can more stably stand up and has a drying room suitable for being provided with a relatively large size. In the case of the drying room having a relatively large size, the operation of handing or picking up the cloths is still convenient and becomes very humanized.

In addition, the present foot also can be applied onto columnar humidifier or columnar clothing garment steamer.

DETAILED DESCRIPTION OF THE EMBODIMENTS

Now the present invention will be described in detail with referring to the accompanying drawings and embodiments.

First Embodiment

Figure 1:
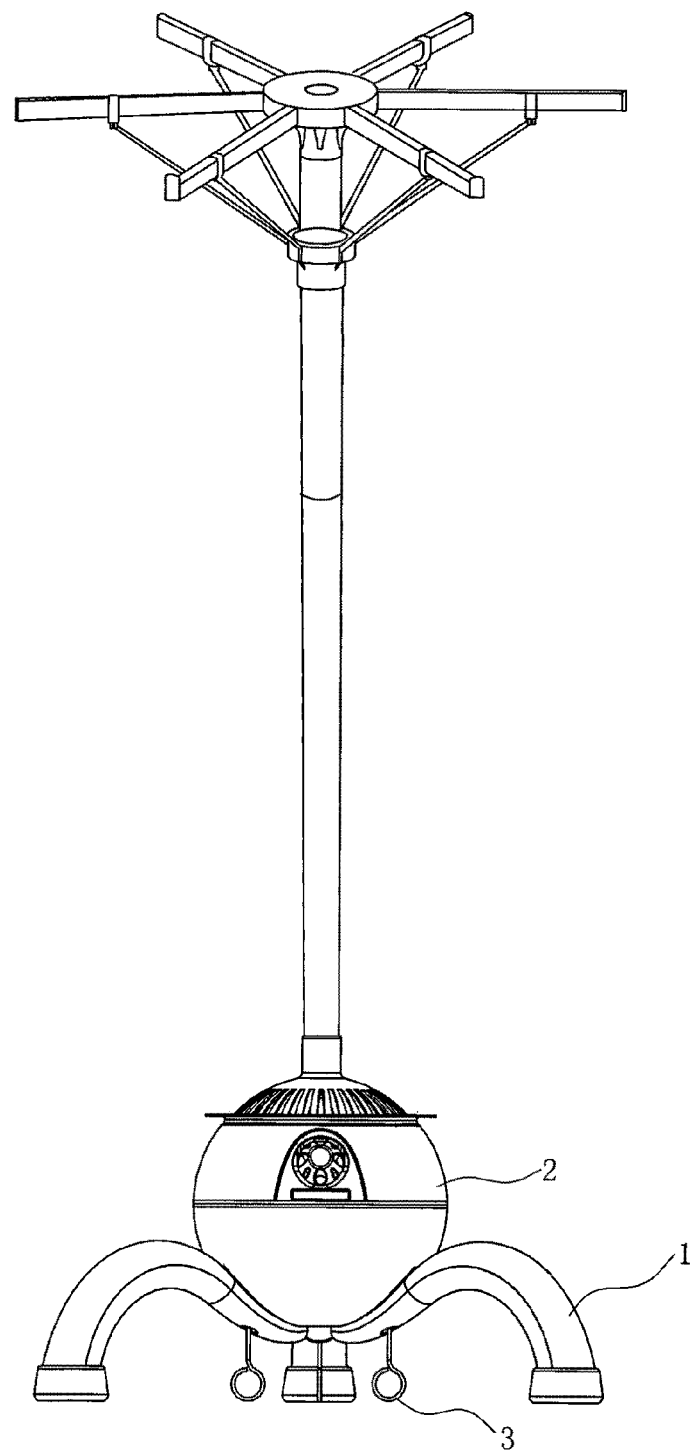
FIG. 1 is a schematic view of structures applied on a shed type dryer in accordance with a first embodiment of the present invention.
Figure 2:
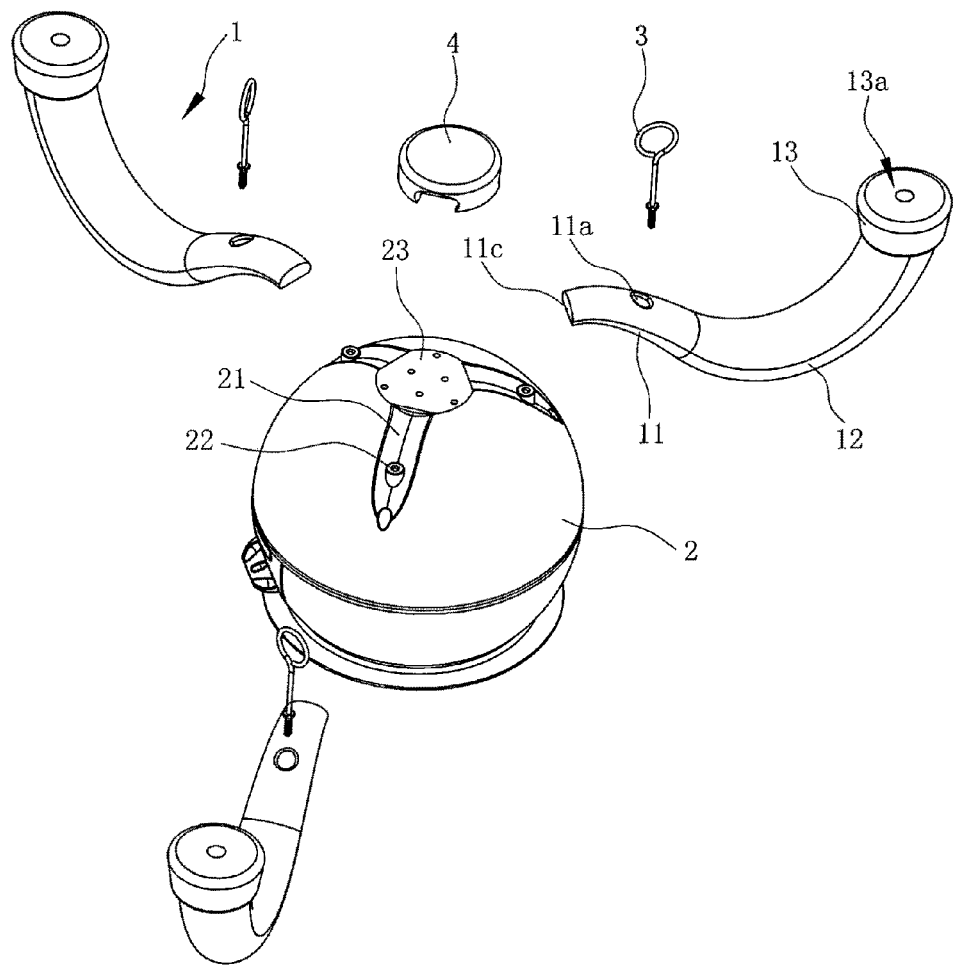
FIG. 2 is an exploded perspective view of the structures in accordance with the first embodiment of the present invention.

As shown by FIGS. 1 and 2, there is one preferred embodiment of the present invention.

The present embodiment as shown by FIG. 1 is applied in the shed type dryer which has a ball-shaped heater housing 2. There are three feet 1 uniformly arranged under the heater housing 2, so that the overall dryer will stably stand on the ground.

Each foot 1 is curved on the whole, and includes a first part 11, a second part 12 and a third part 13 connected successively.

A shape of the first part 11 is matched with a spherical shape of the heater housing 2, and has a certain radian. A groove 21 adapted to the shape of the first part 11, is provided on the bottom of the heater housing 2. An upper surface of the first part 11 is embedded within the groove 21, so that the upper surface of the first part 11 is kept close to/attached to the heater housing 2, thereby holding the heater. One end 11c of the first part 11 is located at the centre of the bottom of the heater housing 2.

Meanwhile, the first part 11 is provided with a through hole 11a, while the bottom of the heater housing 2 accordingly is arranged with a screw hole or screw holes 22. A threaded portion of a screw rod 3 is threaded to the screw hole 22 of the heater housing 2 through the through hole 11a of the first part 11, thereby reliably connecting the first part 11 with the heater housing 2.

In addition, an insert portion 23 for receiving the end 11c of the first part 11, is disposed on the centre of the bottom of the heater housing 2, so as to make the positioning and fixing of the feet easy. Moreover, a shroud cover 4 is used to cover the centre of the bottom of the heater housing 2, and covers the ends 11c of the first part 11 of all feet 1, located under the heater housing 2, thereby fixing them. This arrangement will enable the bottom of the heater housing 2 to become more neat and aesthetic.

The second part 12 is arched.

An end of the third part 13 has a horizontal bottom surface 13a to stand up on the ground.

After fixing the feet 1 and the heater housing 2 with the screw rod 3, the end of the screw rod 3 just lies on a same horizontal plane as the horizontal bottom surface of the end of the third part 13. Therefore, the screw rod 3 is not only used to fix the feet 1, but also is used to support the heater, with the feet 1 altogether.

Second Embodiment

Figure 3:
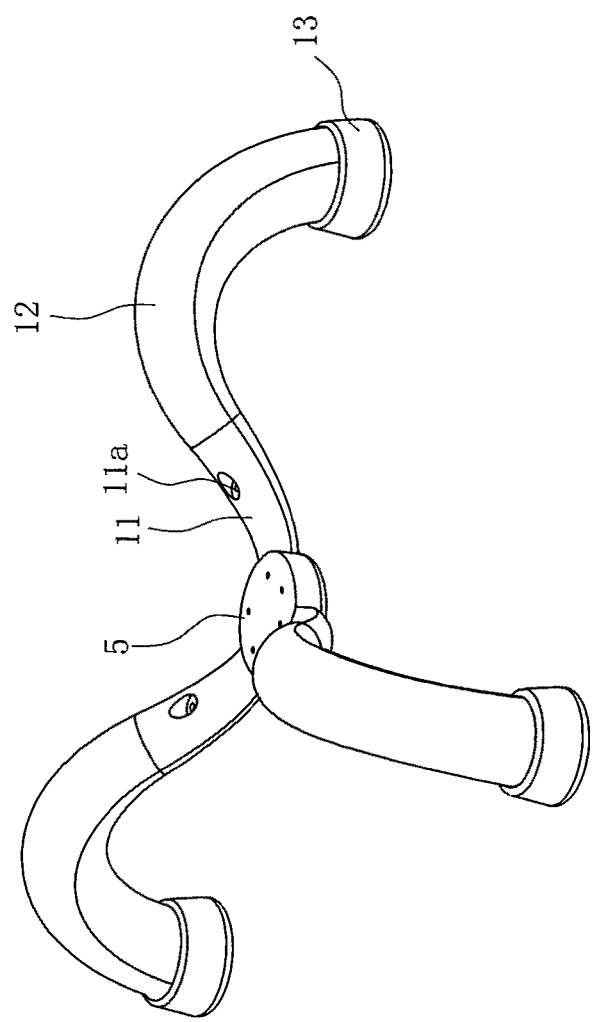
FIG. 3 is a schematic view of structures in accordance with a second embodiment of the present invention.

As shown by FIG. 3, it illustrates the second embodiment of the present invention. The difference of it from the first embodiment lies in that: the supports for the shed type dryer are integrally connected by a connecting portion 5, which is disc-shaped. The connecting portion 5 is respectively connected with an end 11c of the first part 11 of the each feet 1, thereby integrally connecting the three feet 1.

Third Embodiment

Figure 4:
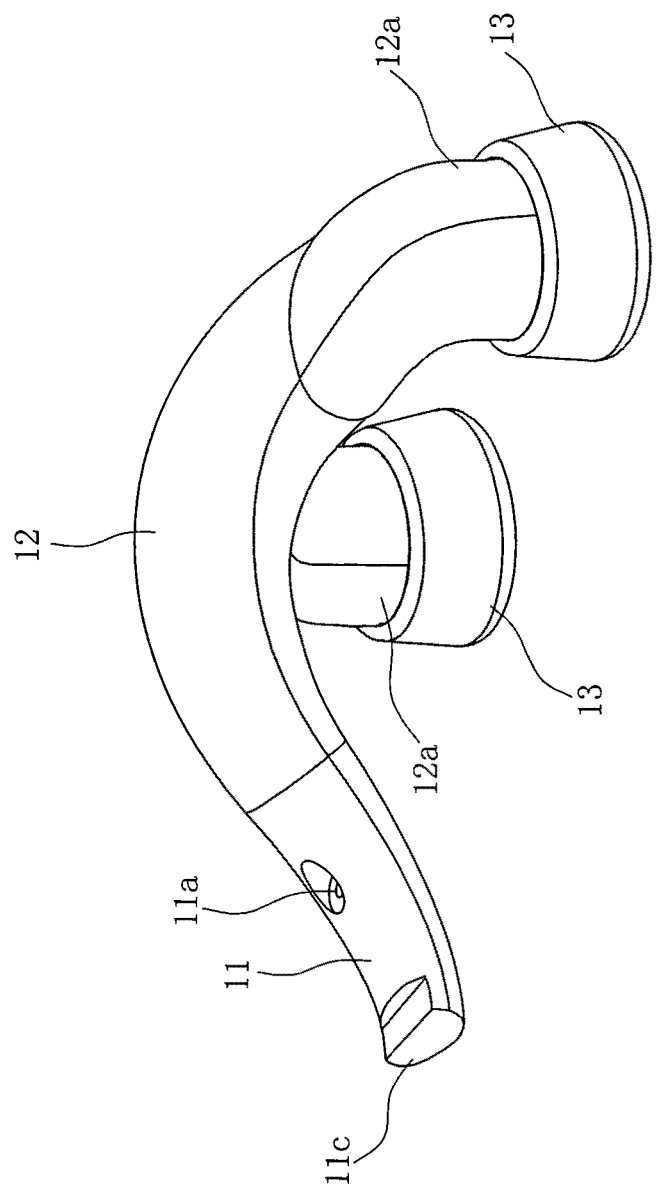
FIG. 4 is a schematic view of structures in accordance with a third embodiment of the present invention.

As shown by FIG. 4, it illustrates the third embodiment of the present invention. The difference of it from the first embodiment lies in that: the second part 12 is branched toward two sides and has two ends 12a; while each foot includes two third parts 13, which are respectively connected with the ends 12a of the second parts 12.

Fourth Embodiment

Figure 5:
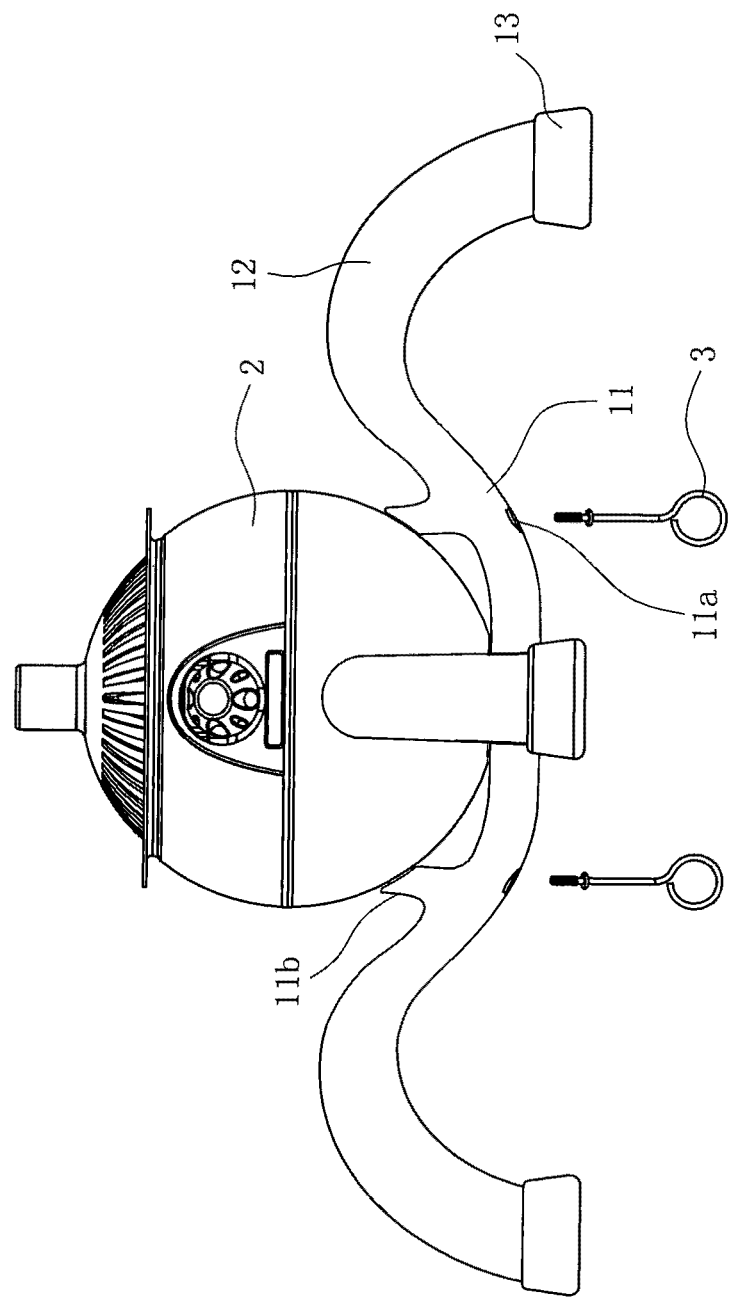
FIG. 5 is a schematic view of structures in accordance with a fourth embodiment of the present invention.

As shown by FIG. 5, it illustrates the fourth embodiment of the present invention. The difference of it from the first embodiment lies in that: in the present embodiment, the support includes four feet 1 as described above, an upper surface of the first part 11 of each feet 1 has a protrusion 11b being in contact with the heater housing 2; and the through hole 11a of the first part 11 is just located at the position of the protrusion 11b. As such, the screw rod 3 passes through the whole protrusion 11b via the through hole 11a.

Fifth Embodiment

Figure 6:
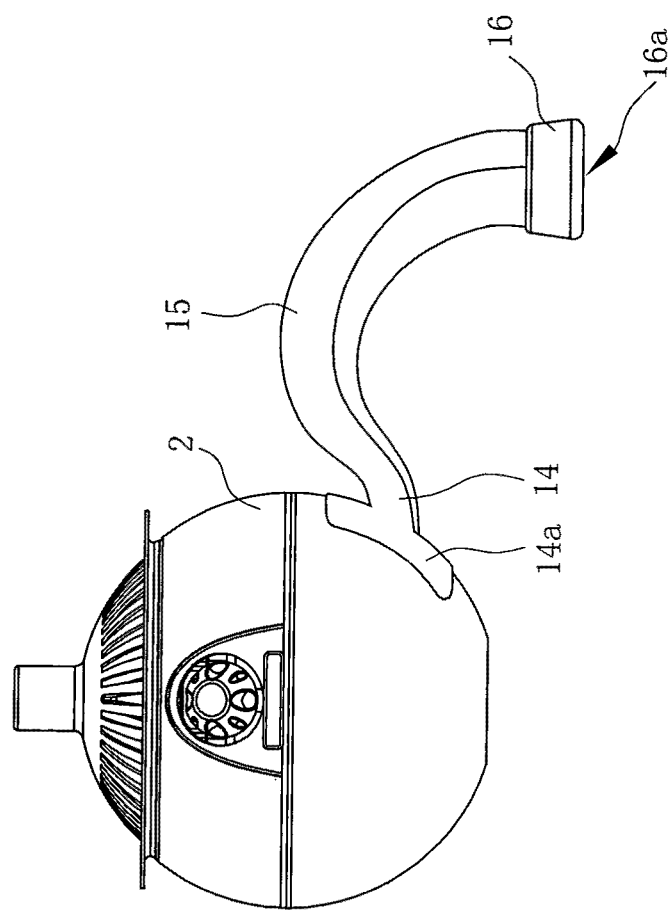
FIG. 6 is a schematic view of structures in accordance with a fifth embodiment of the present invention.

As shown by FIG. 6, it illustrates the fifth embodiment of the present invention. The support for the shed type dryer is curved on the whole and includes a first part 14, a second part 15 and a third part 16 successively connected.

Furthermore, the end of the first part 14 is connected with the heater housing 2. The second part 15 is arched. The end of the third part 16 has a horizontal bottom surface 16a to stand up on the ground.

In addition, the end of the first part 14 has an attachment portion 14a which has a shape matched or adapted to the shape of the heater housing 2. An inner surface of the attachment portion 14a is attached and connected with the heater housing 2.

Sixth Embodiment

Figure 7:
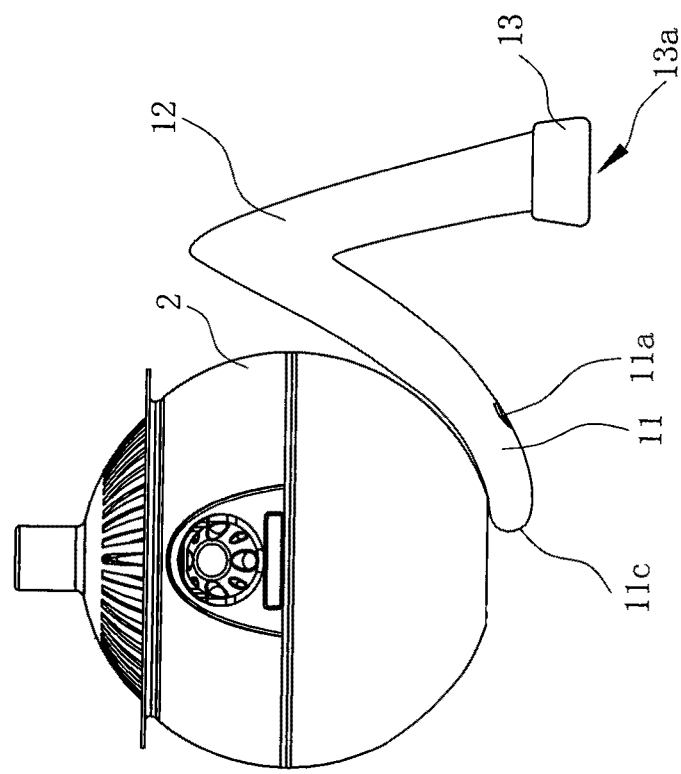
FIG. 7 is a schematic view of structures in accordance with a sixth embodiment of the present invention.

As shown by FIG. 7, it illustrates the sixth embodiment of the present invention. The difference of it from the first embodiment lies in that: the second part 12 has an inverse V shape.

Seventh Embodiment

Figure 8:
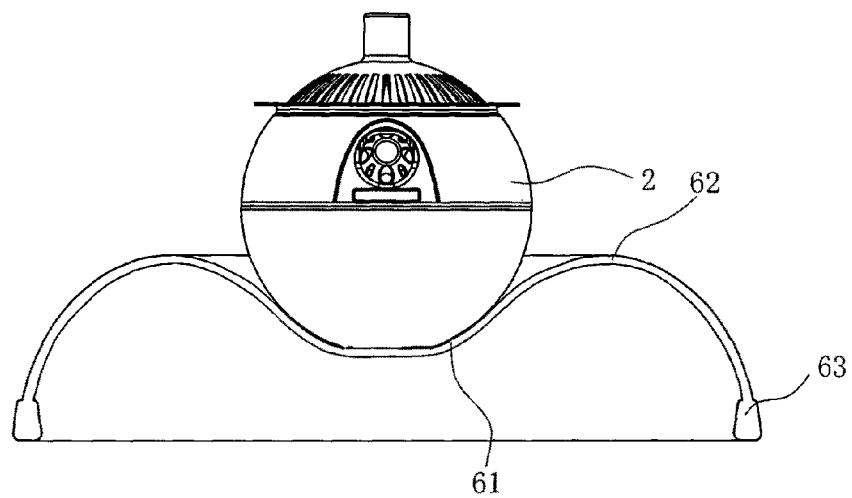
FIG. 8 is a schematic view of structures in accordance with a seventh embodiment of the present invention.
Figure 9:
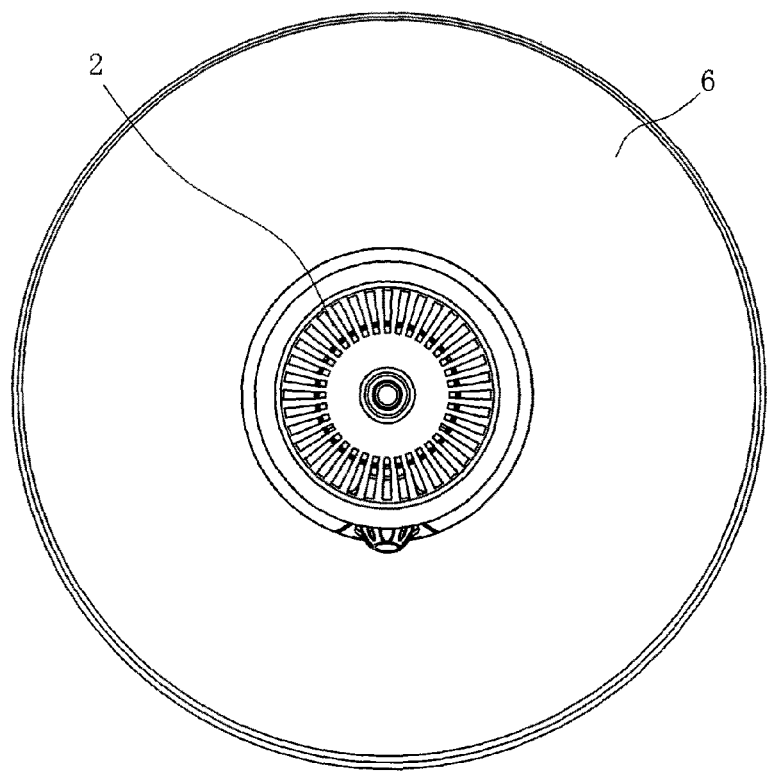
FIG. 9 is a top view of FIG. 8.

As shown by FIGS. 8 and 9, they illustrate the seventh embodiment of the present invention. The support for the shed type dryer is a support seat 6 having a smooth surface. The support seat 6 is a shroud body which has a circular shape in a top view thereof.

The support seat 6 includes a first part 61 located at a central part thereof, a second part 62 at the periphery of the first part 61 and a third part 63 at the bottom of the support seat 6, being integrally formed together.

A section of the first part 61 is bowl shaped, and is used to hold the heater housing 2.

A section of the second part 62 has a shape which firstly extends a certain distance toward upper direction of the periphery of the heater housing 2 from bottom to top and from inside to outside to gradually become away from the heater housing and then extends toward the ground direction of the periphery of the heater housing 2 from top to bottom and from inside to outside, to fall down therefrom.

Further, the bottom edge of the third part 63 is horizontal to stand up on the ground.

Eighth Embodiment

Figure 10:
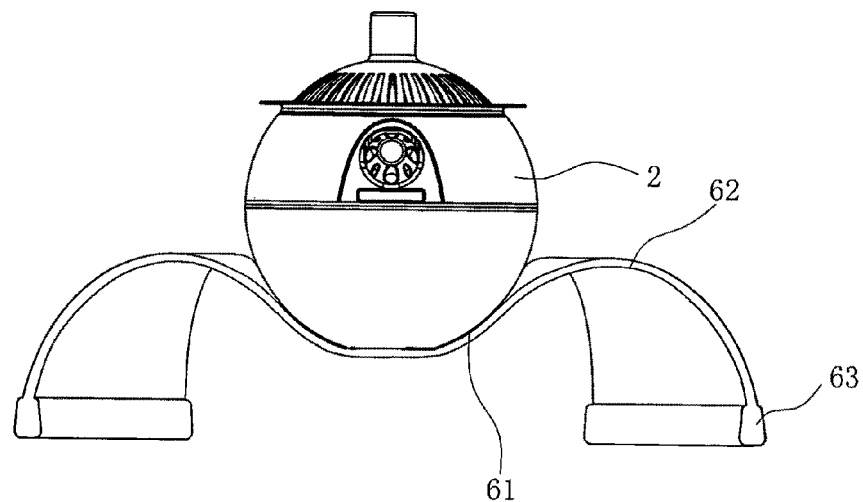
FIG. 10 is a schematic view of structures in accordance with an eighth embodiment of the present invention.
Figure 11:
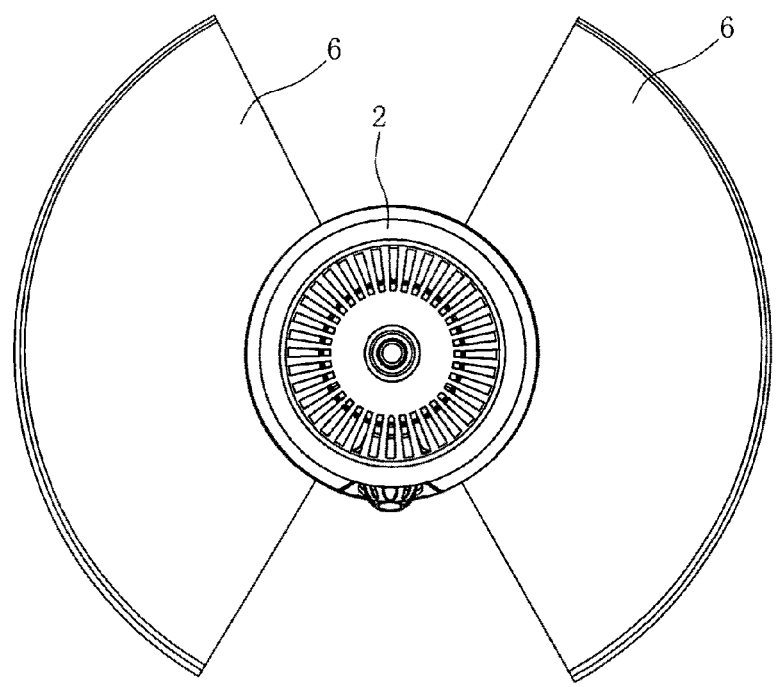
FIG. 11 is a top view of FIG. 10.

As shown by FIGS. 10 and 11, they illustrate the eighth embodiment of the present invention. The difference of it from the seventh embodiment lies in that: the support seat 6 includes two brackets which are arranged to be centrosymmetric about the heater housing 2.

Ninth Embodiment

Figure 12:
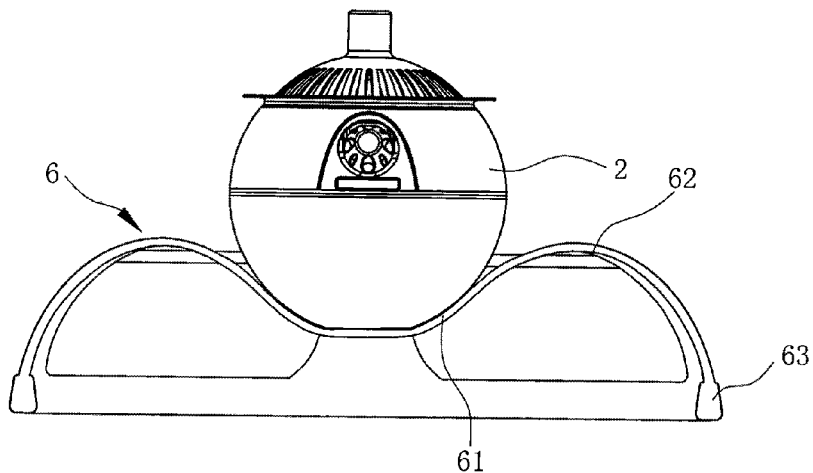
FIG. 12 is a schematic view of structures in accordance with a ninth embodiment of the present invention.
Figure 13:
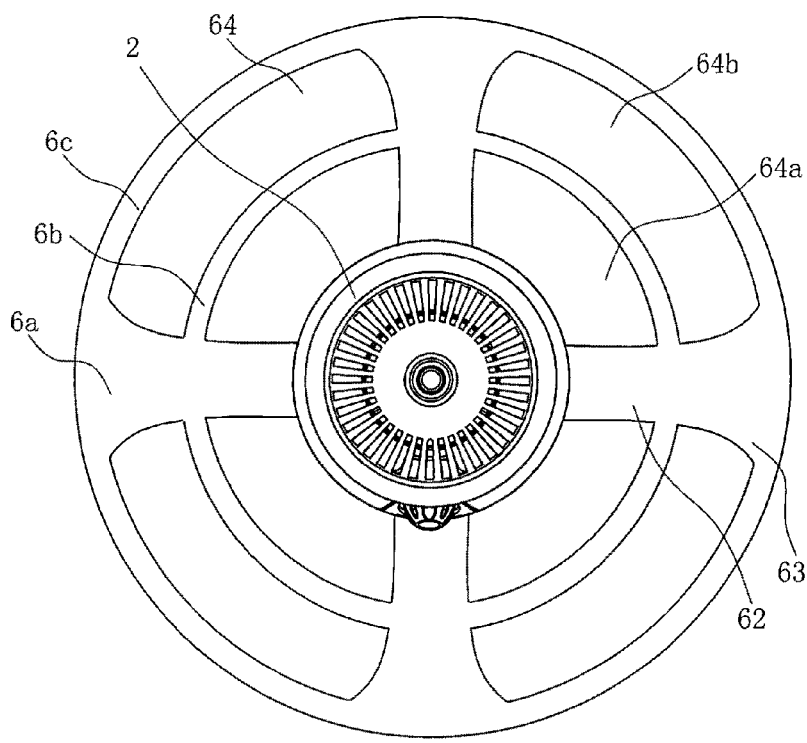
FIG. 13 is a top view of FIG. 12.

As shown by FIGS. 12 and 13, they illustrate the ninth embodiment of the present invention. The difference of it from the seventh embodiment is as follows. The shroud body of the support seat 6 is symmetrically provided with a plurality of through holes 64. In the present embodiment, the through holes 64 includes four set of holes, and each set of through holes 64 includes an inside through hole 64a and an outside through hole 64b arranged from centre to periphery of the support seat 6 in sequence, so that the support seat 6 is formed with four support feet 6a, a first connecting ring 6b connected to the second part 62 of each support feet 6 and a second connecting ring 6c connected to the bottom edge of the third part 63 of each support feet 6.

What the claim is:

1. A support for a shed type dryer, wherein said shed type dryer having a ball-shaped heater housing, said support comprising:
    a plurality of feet, wherein each foot (1) of said plurality of feet extends outwardly from a center of said shed type dryer and is curved in whole and comprises:
    a first part (11) having a generally spherical curvature for matching a curvature of said ball-shaped heater housing, and having an upper surface for attaching to said ball-shaped heater housing (2) so as to hold a heater, wherein said ball-shaped heater housing (2) having a bottom surface and a center of said bottom surface;
    an insert portion (23) for receiving an end (11c) of said first part (11) in said ball-shape heating housing, said insert part is disposed at said center of said bottom surface of said ball-shaped heater housing (2), so as to make easy the positioning and fixing of said each foot (1)
    a second part (12) having an arched shape with a curvature peak directed toward a top to said shed type dryer, wherein said second part having a first end connected to said first part, wherein the curvature of said second part follows the direction of the periphery of said ball-shaped heater housing before reaching said curvature peak, then said second part curves down toward the bottom; and
    a third part (13) connected to said second part for providing a horizontal bottom surface to stand up on a ground.

2. The support for a shed type dryer of claim 1 further comprises a shroud cover (4) for covering the center of the bottom surface of said ball-shaped heater housing (2) and the ends (11c) of said first part (11).

3. The support for a shed type dryer of claim 1 further comprises a screw rod (3) for fixing said first part (11) to said ball-shaped heating housing, wherein once the screw rod (3) is placed, an end of said screw rod lies on a same horizontal plane as the horizontal bottom surface of the end of said third part (13).

4. The support for a shed type dryer of claim 1 further comprises a disc-shaped connecting part (5) for integrally connecting each foot (1) of said plurality of feet.

\* \* \* \* \*